Sept. 24, 1957　　　C. C. RAYBURN ET AL　　　2,807,350
VIBRATORY ORIENTING FEEDER

Filed June 24, 1953　　　　　　　　　　　6 Sheets-Sheet 1

INVENTORS
Charles C. Rayburn
James G. Black
BY
ATTORNEYS

INVENTORS
Charles C. Rayburn
James G. Black
BY [signatures]
ATTORNEYS

Sept. 24, 1957     C. C. RAYBURN ET AL     2,807,350
VIBRATORY ORIENTING FEEDER
Filed June 24, 1953     6 Sheets-Sheet 3
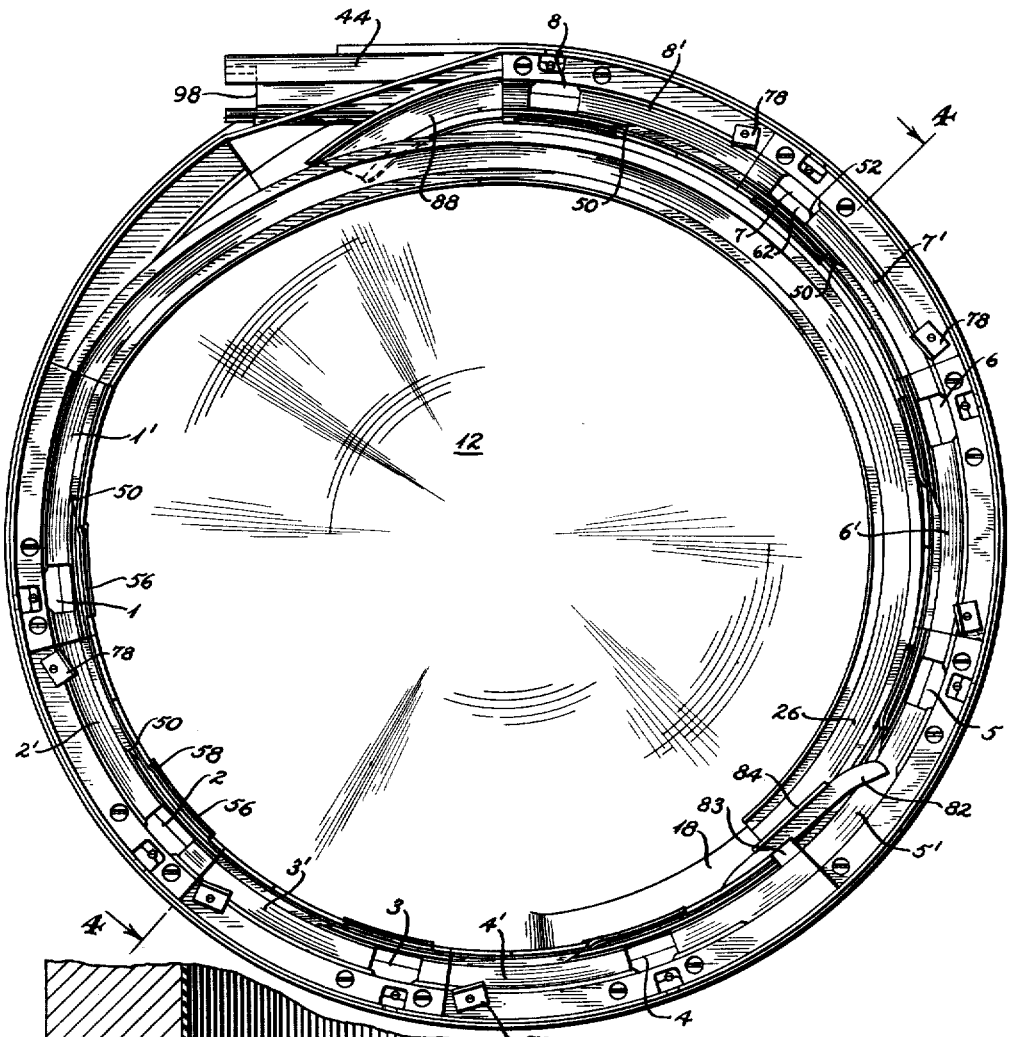
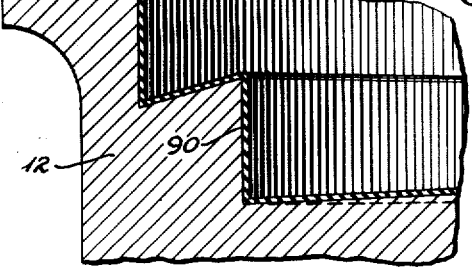
INVENTORS
*Charles C. Rayburn*
*and James G. Black*
BY
*Walter S. Paul*
ATTORNEYS

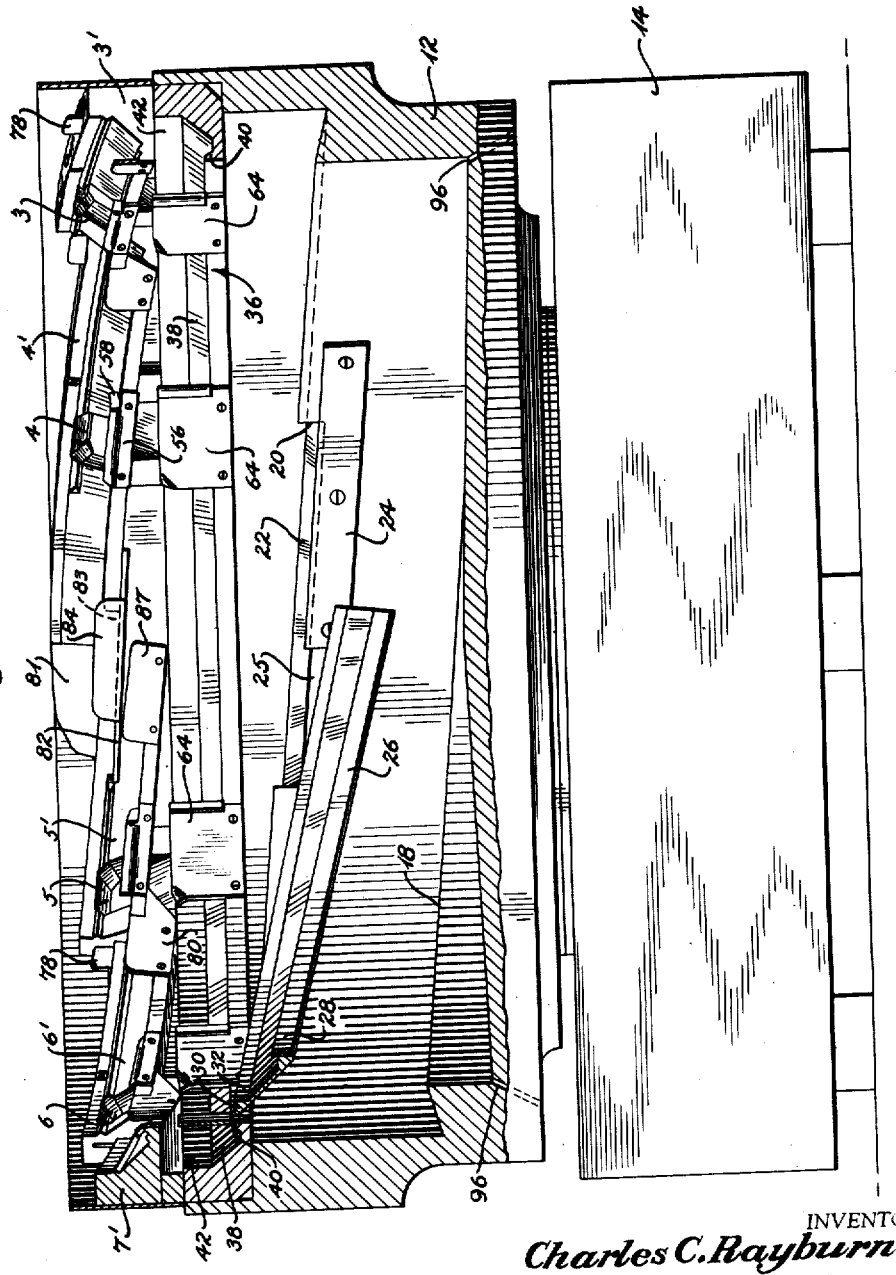

Sept. 24, 1957 C. C. RAYBURN ET AL 2,807,350
VIBRATORY ORIENTING FEEDER
Filed June 24, 1953 6 Sheets-Sheet 5
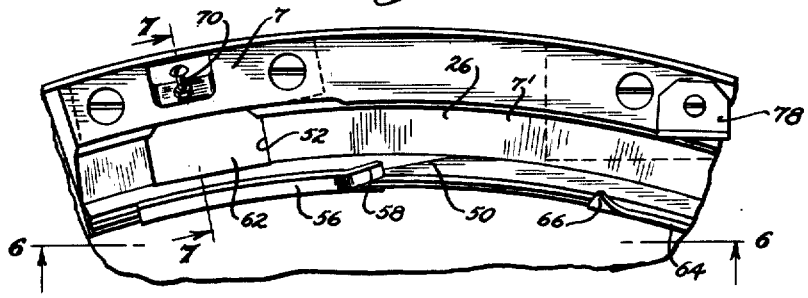
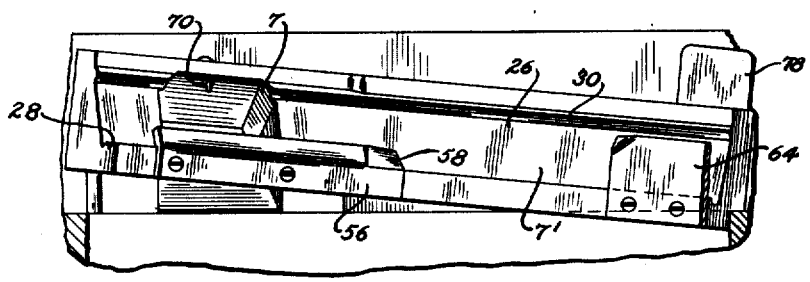
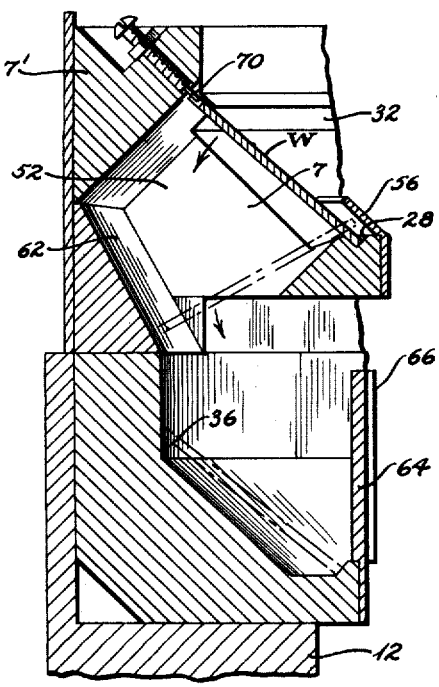
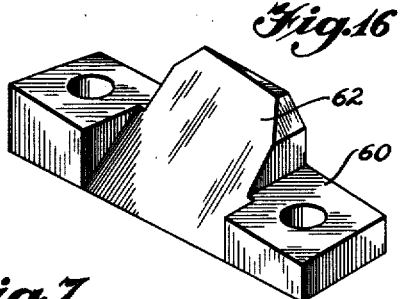
INVENTORS
Charles C. Rayburn
James G. Black
BY
*[signatures]*
ATTORNEYS United States Patent Office 2,807,350
Patented Sept. 24, 1957

1

2,807,350
VIBRATORY ORIENTING FEEDER

Charles C. Rayburn and James G. Black, Jr., Falls Church, Va., assignors to the United States of America as represented by the Secretary of the Navy Application June 24, 1953, Serial No. 363,952

31 Claims. (Cl. 198—33)

(Granted under Title 35, U. S. Code (1952), sec. 266)

The invention described herein may be manufactured and used by or for the Government of the United States of America for governmental purposes without the payment of any royalties thereon or therefor.

This invention relates to devices for feeding articles to machines, magazines, chutes or any other destination and in the process of feeding, orienting the articles to a predetermined position.

As pointed out in copending application Serial No. 324,160 by Robert L. Henry, filed on December 4, 1952, now Patent No. 2,771,663, it is possible to mass produce electronic equipment by a fully mechanical process, the process described therein relying on a standard ceramic wafer W as a base upon which the electronic equipment is developed. The ceramic wafer is slightly less than a square inch in planform and quite thin, and is provided with a number of edge notches, the primary purpose for which not being important here, with the exception of a single, orienting notch of a size different from all the others and the use of certain notches to aid in rotating the wafers for arriving at proper orientation. For proper operation of the Henry method it is essential that the ceramic wafers be oriented so that the orienting notch of each be facing a single direction prior to acceptance by the various machines used in the method. Accordingly, an object of this invention is to provide a device for orienting the wafers of a completely disorderly collocation of the same, and feeding the oriented wafers directly to a machine, storage magazine or the like, and perform this function without unduly stressing the frangible, ceramic wafers.

In instances where the dimensions of length and width of the articles handled are significant, there are usually two machines required, one to test for the proper dimensions, rejecting the faulty articles, and another machine for orienting the articles.

Another object of this invention is to provide an orienting feeder for articles, which inherently samples the dimensions thereof during the orienting of the articles, rejecting those articles which fail to meet specified dimensions.

A more specific object of the invention is to provide means connected to a vibratory elevator bowl for constraining the travel of articles located in the bowl as they are moved by bowl vibratory motion, through a path of travel that carries the articles over orientation testing openings with means in the openings for preventing the articles from falling therethrough unless the articles are oriented properly whereby only correctly positioned articles are allowed to collect upon a collector and discharge track for ultimate emptying from the device.

Another object of the invention is to teach a method or process of orienting and feeding articles in a rigidly singular position by employing the vibratory translation principle to extract from a supply, a stream of articles, moving them in a generally circular path up an inclined track to various orientation testing stations at each of which, articles that are in a predetermined position are extracted from the stream and deposited on a discharge track, but those articles that pass over some of the stations being rotated prior to reaching the next station, and mid-way between the testing stations, inverting the articles in the stream to present the opportunity for article testing on both sides of the articles.

As a subcombination of the above, the method involved herein teaches the technique of rotating flat generally square articles for testing the orientation thereof by moving them along in a path of travel while supporting them near or at the top and lower edges only, gradually removing that support from the top and lower edges of the articles from the leading toward the trailing edges of the articles until the center of gravity of the article to be rotated is in advance of the forewardmost point of support of the article whence the forwardmost supported point along the bottom edge acts as a fulcrum with the mass of the article rotating it.

In addition, the method teaches the inversion of articles while moving them along in a path, each being supported at or near the upper and lower edges thereof, by withdrawing gradually only the support at the upper edge from leading to trailing edge until the support of the upper edge of the articles is substantially or completely withdrawn at which time the article falls, upper edge down, rotating the article to an inverted position.

Other objects and features of importance will become apparent in following the description of the illustrated form of the invention.

In the drawings:

Fig. 3 is a plan view of the device;

Fig. 4 is a sectional view of the device taken on the line 4—4 of Fig. 3 and in the direction of the arrows;

Fig. 5 is an enlarged fragmentary plan view of the device, showing one orientation testing station;

Fig. 6 is a view taken on the line 6—6 of Fig. 5;

Fig. 7 is an enlarged sectional view taken on the line 7—7 of Fig. 5;

Fig. 16 is a perspective view of a guide used in the device; and

Fig. 17 is a fragmentary sectional view of the device showing the film of rubber or material of like characteristics, in exaggerated thickness that preferably covers the major part of the surfaces over which the articles move.

Figure 1:
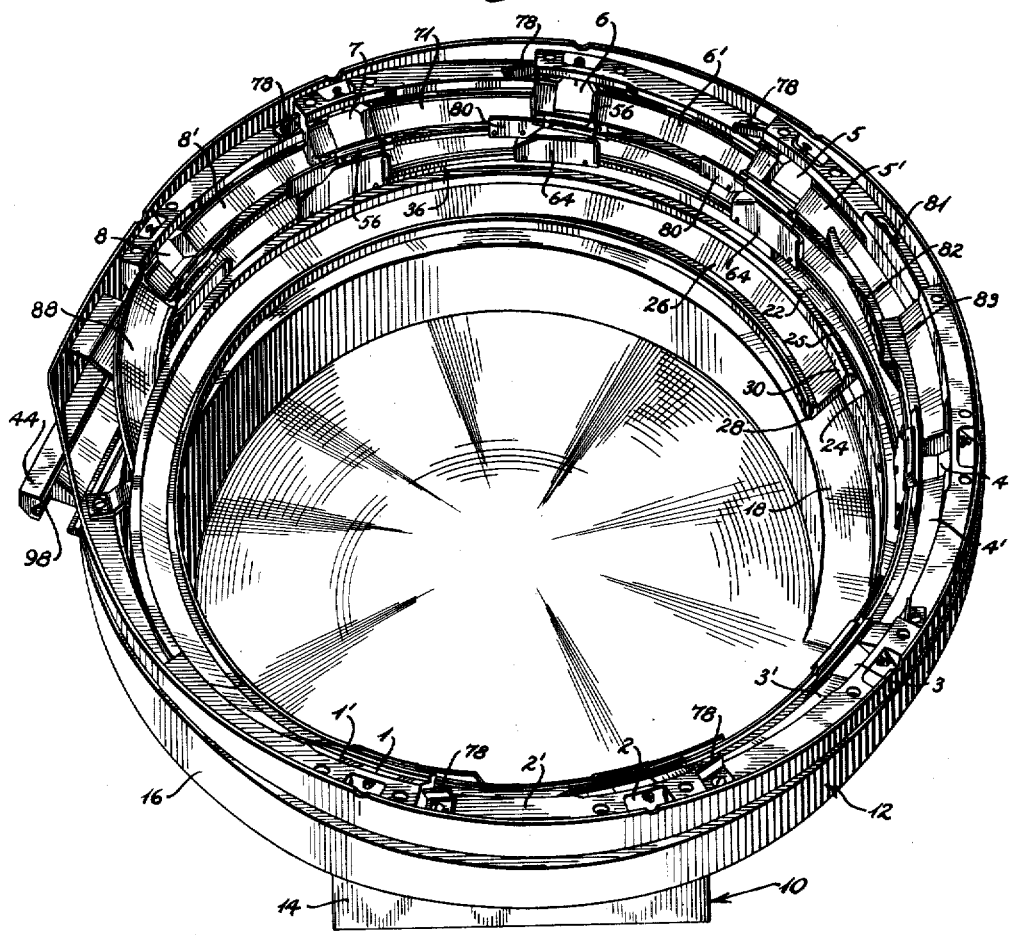
Fig. 1 is a perspective view of the vibratory orienting feed device.
Figures 8, 9:
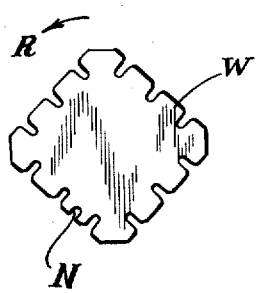
Fig. 8 is an elevational view of a wafer showing it in what is defined as rotation, as used herein.
Fig. 9 is an end view of a wafer showing it being inverted in the direction of the arrow.

The ceramic wafer W that is handled by the vibratory orienting feed device is moved in various ways throughout the process and in the apparatus. It is to be understood that when the article, as wafer W, is said to rotate, we mean that the article is moved about an axis perpendicular to and passing through the center of one or both of the surfaces of the flat, substantially square article. The term "invert" or a derivative thereof is reserved to describe article motion about an axis that is normal to two opposite edges of the article. Thus rotation is indicated at R in Fig. 8 and inversion is indicated at I in Fig. 9.

In practicing the invention, a vibratory elevator, as the "Syntron" (trademark, reg. U. S. Pat. Off.) Syntron Co., Homer City, Pa., is used. Elevator 10 relies on vibration to impart motion to articles. Provided with the elevator 10 is a base in the form of a bowl 12 which is vibrated in such a way by electro-mechanical means in housing 14 as to cause articles placed in the bowl to move radially outwardly of the bowl 12 and in a circular path along its wall 16, thus imparting linear motion to the wafers. The vibrating mechanism, its housing 14 and a bowl are known devices and are used in conjunction with the orientating attachment secured to the bowl, constituting a vibratory base for the attachment. Thus, articles placed inside the bowl in any arrangement, orderly or not, are moved up the article receiving track 18, secured to or an integral part of the bowl 12. An exit slot 39 may be provided in the wall of bowl 12 to accept the articles that move up track 18 so that the articles may be fed to some other equipment, but no consideration would be given to the orientation of the articles nor the side of the articles facing upward.

Figure 2:
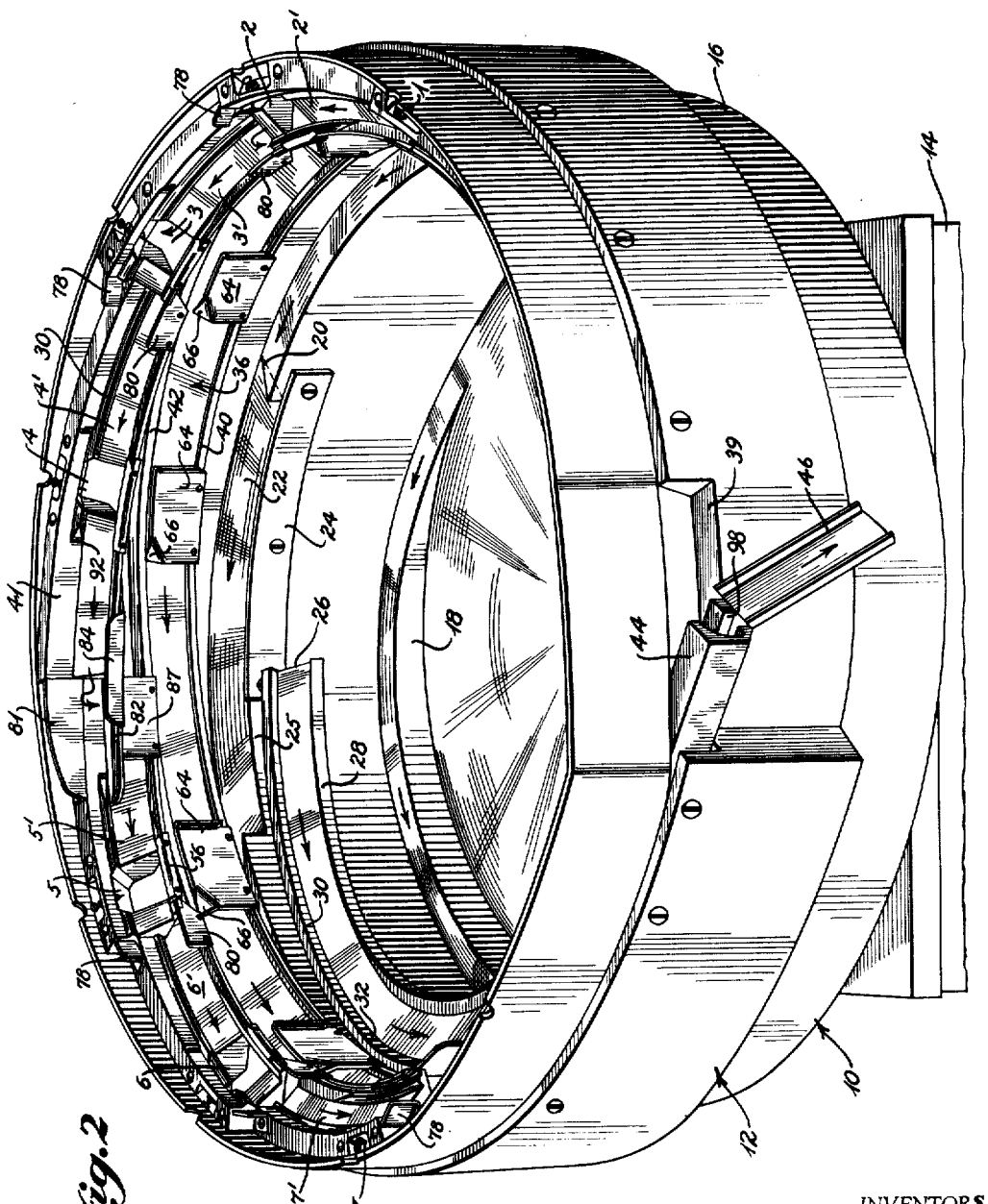
Fig. 2 is a perspective view of the vibratory feed device of Fig. 1 but in larger scale and taken from a different position of sight from that of Fig. 1.

Briefly, the invention adds to the capability of the described vibratory elevator by enabling the elevator to orient the articles so that before they are discharged, each article is oriented in one direction, and also to turn the articles over, that is invert them, prior to discharge only if they require this particular operation. The result is that before the articles are discharged from the device, each must be oriented in a single direction. The inclined track 18 which first accepts the articles, as wafers W, is helical in form and slopes toward the inner surface of the bowl wall to a point 20 (Figs. 2 and 4) where it abruptly changes its slope direction to away from the bowl wall surface and toward the center of the bowl. The latter track portion 22 has a fence 24, secured to bowl 12, extending along a portion of its length to prevent wafers from falling into the bowl as they move from the entrance of track 18 to its portion 22. From Fig. 2 it is seen that the portion 22 which extends beyond the fence 24 will serve as a slide or passage 25 through which articles may pass in order to drop, by gravity, on a spiral track 26 which is fixed to bowl 12. Since all parts of the device are secured to bowl 12, they receive vibratory impulses therefrom and any articles placed on the various parts of the device will be moved in the same manner as the movement of articles in the bowl proper.

Track 26 is transversely inclined toward the bowl center, and has a rail 28 along its inner periphery forming a guide for one edge of the wafers, together with another rail or rib 30 at its outer periphery. Rib 30 has an inclined surface 32 upon which the wafer edge opposite the edge that contacts rail 28 rests. Although track 26 may be of one piece construction, as a manufacturing expedient, it is composed of eight arcuate segments 1', 2', 3', 4', 5', 6', 7' and 8' connected at their ends to form a stepped helix in which eight orientation testing stations are arranged. There are, in this embodiment of the invention eight stations because the wafer W has four main side edges and two surfaces, i. e. upper and lower, meaning that there are eight possible positions in which the wafers could be received upon track 26 from passage 25. If the wafer W were three or six sided, the number of testing stations would be correspondingly changed. The nature of each testing station will be described subsequently. At present, it is noted that each station has an opening through which properly oriented wafers fall.

They fall upon discharge or collector means 36 that consists of a track 38 which is preferably horizontal and disposed beneath the sampling stations. Track 38 is transversely inclined toward the bowl center and has a lower rail or lip 40 and upper wall surface 42 on which the lower and upper edges respectively of the wafers ride. The track 38 is almost circular, there being an end, however, that extends through the aperture 39 in bowl 12, that end having a protective plate 44 (Fig. 2) thereover to keep the wafers moving smoothly. At this point in the system, which is the wafer discharge point, the wafers now properly oriented, are accepted by a machine, magazine or other equipment. An inlet chute 46 (Fig. 2) schematically illustrates acceptance of the wafers by some other device.

The eight orientation testing stations 1, 2, 3, 4, 5, 6, 7, and 8 are formed respectively in segments 1', 2', 3', 4', 5', 6', 7', and 8' of the orientation testing track 26, and each station is similar in construction. Station 7 is shown in section in Fig. 7, while an examination of Figs. 5, 6 and 16 shows in detail station 7. As a wafer moves along track 26, one edge riding on surface 32 and the opposite edge on rail 28, the lower edge of the wafer is moved closer to the center of bowl 12 since a cam or guide 50 on track 26 near rail 28 guides it in that direction just prior to reaching aperture 52 (Fig. 5) of station 7. The result is to urge the lower edge of the wafer away from the aperture 52 so that the upper edge will tend to move downward through the aperture 52. During this operation, the lower edge of the wafer is prevented from falling over rail 28 by baffle 56 connected to track 26 in confronting relation to aperture 52. In addition, baffle 56 has a lip 58 at one end which is located across from the front part of guide 50 to further assure that the wafers will move in the proper path.

Aperture or opening 52 is formed in track 26 above the collector track 36 so that any articles that fall through the opening may be captured and led to the discharge portion of the device. The action of a wafer falling through opening 52 is depicted in Fig. 7. As previously indicated the testing station containing track is preferably composed of a plurality of arcuate segments and this brings into focus the utility of block 60 shown in Fig. 16. It serves as a rest for one end of each segment, and the slide 62 thereof constitutes the bottom of the testing station opening. It is inclined downward toward discharge track 36 and opens thereinto. Since the entire apparatus is subjected to vibratory motions, guards 64 are disposed on the inner edge of the discharge track 36 at spaced intervals, one for each station to prevent wafers W from falling off collector or discharge track 36 at the places where they are accepted from the testing stations. A corner 66 of each guard is turned in to aid in this function.

Each station opening has a pin 70 extending therein from the upper edge thereof, the pin preferably being a screw with a lock nut so that it may be adjusted as to depth of penetration into the station opening. The location of pin 70 and the configuration of wafer W (see Fig. 8) requires that the pin 70 pass through orienting notch N, that is the smallest of all other notches in the wafer W, before the wafer can pass through the testing station opening and onto the discharge track 36. This is so due to the location of pin 70 with respect to the opening, for example opening 52 of Fig. 5, that is barely large enough to allow the wafer to pass therethrough. The pin 70 is in advance of the center of opening 52 and requires that the wafer W have notch N along its top edge and in advance of the two adjacent, deeper notches behind it. If the wafer enters a testing station, with the orienting notch on the leading or trailing or bottom edges, the wafer will pass over the station because the pin 70 lies under the wafer parts between the deep notches at the instant of wafer travel where the wafer would fit into the opening. If the orienting notch succeeds the pair of deep notches even though it is on the upper wafer edge, the wafer will not fall through the opening since the pin 70 is forward of the center of the opening and at the instant that the wafer would fit through aperture 52, the pin prevents this by contacting the wafer between the pair of deep notches. If the wafer enters the station properly, that is with the notch N leading the pair of adjacent deeper notches, the wafer will fall through the testing station opening, pin 70 passing through notch N, inverting (see Fig. 7), and land upon the adjacent part of collector track 36.

Figure 11:
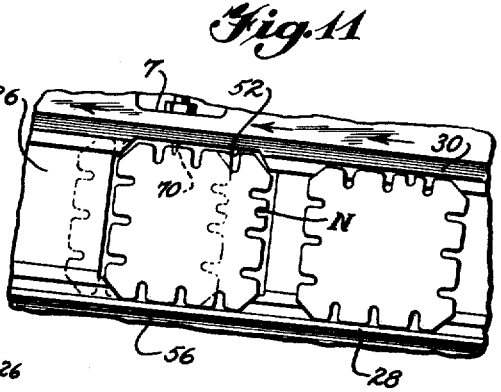
Fig. 11 is a schematic view showing a wafer passing over the testing station, not being accepted thereby because the orientation of the wafer is incorrect.
Figure 12:
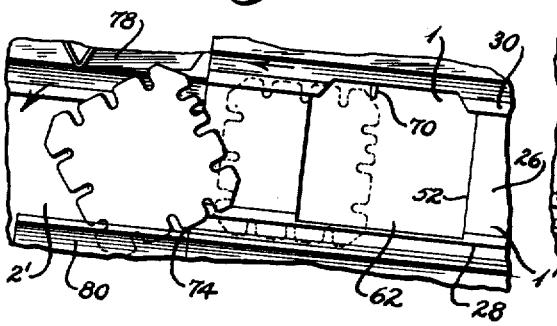
Fig. 12 is a schematic view of a part of the device showing the means for rotating one of the wafers.

When a wafer is rejected by a testing station (Fig. 11), it moves to the next station, but it is first rotated ninety degrees (Fig. 12). This is accomplished in the following manner: The rejected wafer moves along the track 26 formed by the track segment containing the station under consideration, and then falls to the next segment containing its orientation testing station. But in falling, the wafer is rotated ninety degrees. The wafer rides on its lower and upper edges and by withdrawing the support of the lower edge (while the wafer continues to be vibrated forward), the wafer will be pulled by gravity in a rotational manner. Fig. 12 shows this phase of operation, where segment 1' is at a higher level than segment 2', thus providing an abrupt depression and the lower corner 74 of the track 26 on segment 1' serves as a fulcrum for wafer rotation. To facilitate and accelerate rotation of the wafers, an upper plate 78 is provided on the back part of segment 2' as a continuation of segment 1' and is adjusted to guide the wafer in its travel. Baffle 80 on the lower and inner edge of segment 2' prevents the rotating wafer from rolling off the track 26, and emptying into bowl 12.

Figure 15:
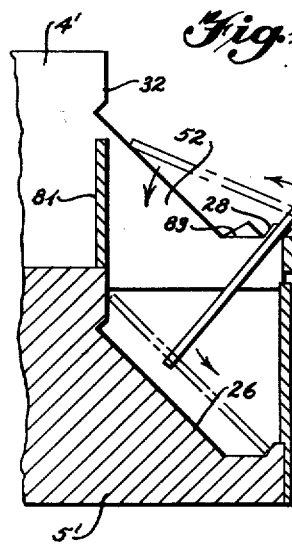
Fig. 15 is a sectional view taken on the line 15—15 of Fig. 14 showing the wafer as it is being inverted.

After testing at stations 1 through 4, taking care of the four edges of wafer W, the wafers that remain are inverted prior to reaching the final four stations. The means for inverting the wafers are seen best in Figs. 2, 14 and 15, and consist of a guide plate 81 at the end of the segment 4', containing station 4, and at the upper edge thereof, together with a platform 82 attached to the same segment 4' but at the lower edge thereof, and having an upstanding guard 84 along one edge. The rail 28 is cut away (see Fig. 14) a short distance at the end of the segment 4' forming a land 83 coplanar with platform 82 to receive the wafer W (compare the locations of full line wafer and dotted line wafer of Fig. 14). Thus the wafer is supported at its bottom edge, but as it progresses, it is supported less at its top edge. Finally gravity inverts it as it falls to the next adjacent segment 5' containing station 5, guard 87 preventing the wafer from spilling into the bowl (Fig. 15). Then it is ready for testing at stations 5 through 8. If the wafers are not accepted at the latter stations for any reason, including a defect in the wafer, they enter the chute 88 (Fig. 3) which empties into the bowl 12. Chute 88 is connected to the end of the final segment 8' and is curved to direct the wafers into the bowl.

A fragment of the bowl 12 is illustrated (Fig. 19) and has a rubber coating 90 thereon. It is preferred that the coating be used in the bowl 12 and on the receiving track 18. Such covering may be sprayed on the parts and will be much thinner than is shown. The purpose of it is to enhance the motion imparting capability of the machine.

*Method and operation*

A number of articles, in the illustrated embodiment, wafers W, are placed in the bowl 12 in no particular organization. They are simply spilled into the bowl. Then the vibrating of the bowl is initiated by a control provided on the vibratory elevator, causing the articles to be moved radially outward of the bowl and circumferentially thereof, counter clockwise. Accordingly, wafers climb up the article receiving track 18, one behind the other, leaning downwardly and outwardly of the bowl due to the lateral slope of track 18 (Fig. 4) until they drop over edge 20 and onto portion 22 during which part of their travel one edge of each wafer rides along fence 24. Upon reaching slide 25, the wafers slide from article receiving track 18 and enter orientation testing track 26, one edge of each wafer contacting rail 28 and the opposite edge of each wafer riding on rib surface 32. Occasionally wafers will pass through slide or passage 25 stacked upon each other, and in these instances only the bottom wafer is captured on track 26, the other one or more fall back into bowl 12, sliding off of the top of the wafer which lands on track 26.

Figure 10:
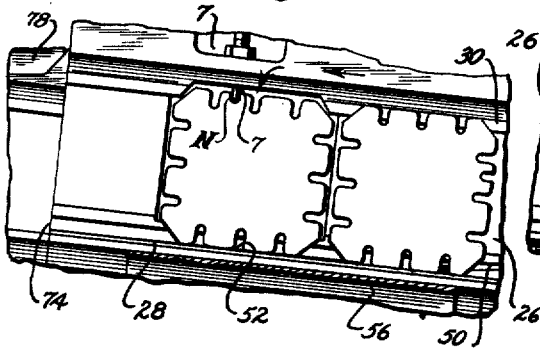
Fig. 10 is a schematic view of a wafer being accepted at a testing station in the device.

Due to the generally helical shape of track 26 the wafers are carried to a location near the top of bowl 12, above the oriented wafer collecting track 36. It is here that the orientation testing, selecting or rejection takes place in the eight testing stations. For reasons previously indicated the eight station system is necessary for complete orientation testing procedure. Fig. 10 indicates a wafer entering one of the testing stations and being accepted, together with another following wafer which will be rejected (Fig. 11) in that the orienting notch N is not in the proper place. As the wafer approaches the testing station opening 52, the lower edge riding on rail 28, is displaced outwardly of the track surface by moving over guide or cam 50 on track 26 to help the wafer topple through opening 52 unless prevented by pin 70. Moreover, the opening 52, see Fig. 10, is not only in the track center but also extends through rib 30, so as the wafer moves into the testing station the support of the wafer is gradually withdrawn, and is substituted by the pin 70 only if the wafer is improperly oriented. To prevent the wafers from vibrating off track 26 at the testing stations, the various guards and baffles, previously described, are used.

When a wafer is accepted, it is inverted 180° (Fig. 7) by rolling around the rail 28 of track 26 which defines the lower edge of the testing station opening. Then it falls upon collector or discharge track 36, guards 64 being provided on track 36 beneath each station 1 through 8 to prevent the wafers from falling back into bowl 12. The operations on this particular wafer are complete save the travel on track 36 to the discharge point at 44. However, the wafers rejected at the initial station move along track 26 to the next station. Track 26 is made of sections or segments, each containing one testing station and each being inclined so that its forward end is elevated above the aft end of the next adjacent segment (Fig. 4). This relation provides the means for rotating the wafers (Fig. 12) ninety degrees prior to reaching the next testing station. The wafer moves along rail 28 and as it moves beyond the end of the segment supporting it, the support of the wafer is gradually withdrawn by reason of the wafer's leading edge going beyond the end of rail 28 on the supporting segment. Thus the pull of gravity rotates the wafer around fulcrum 74, usually by the fulcrum engaging temporarily one of the wafer notches, the wafer being guided by baffle 78 and prevented from jumping the track by guard 80, the wafer coming to rest on the rail and rib of the next segment but in a new position for orientation testing at the testing station in the last mentioned segment. This procedure is repeated for the next station and there is testing without subsequent wafer rotation at station 4.

Figure 13:
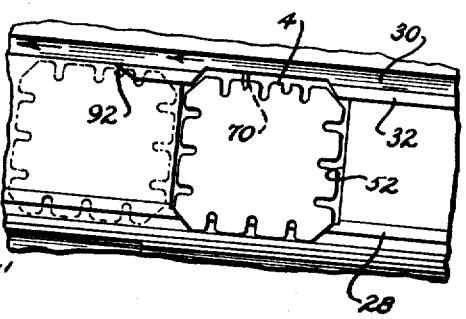
Fig. 13 is a schematic view of a part of the device, showing a wafer position with its small orienting notch located in such positition that the wafer will not be accepted at any testing station unless the wafer is first inverted.
Figure 14:
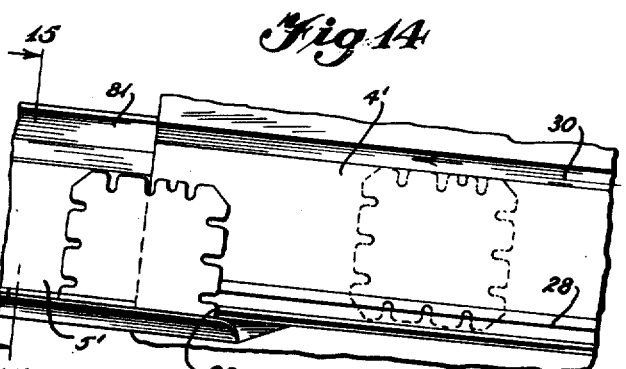
Fig. 14 is a schematic view showing a wafer being inverted.

Instead of the rotation step, the rib 30 on segment 4' is faired into the bottom of the track at 92 (Figs. 2 and 13) so that those wafers rejected by station 4 have the support at their upper edges removed gradually as they progress, allowing them to tilt backward slightly more than usual until they approach and enter the part of track 26 at which wafer inversion takes place. Fig. 13 shows a wafer being rejected at station 4 while Figs. 14 and 15 show the wafer being inverted. Its lower edge has its support withdrawn by discontinuation of rail 28 whereby the wafer's lower edge enters land 83 and platform 82, constrained in travel by guard 84. Upon further motion of the wafer, the upper edge thereof moves completely off segment 4' and topples downwardly, the wafer revolving 180°, turning about the edge 85 (Fig. 15) of platform 82 which projects beyond the front edge of segment 4' and over the rear edge of segment 5'. The wafer than comes to rest on segment 5', being prevented from falling into bowl 12 by guard plate 87 connected to segment 5' below the platform 82.

Thereafter, the wafers enter stations 5', 6', 7' and 8' for further testing with ninety degree rotation following the orientation testing at stations 5, 6 and 7. Any wafers that are not accepted upon completion of the cycle, that is those which go beyond station 8 are finally rejected and directed back into the bowl 12 through chute 88, only to enter article receiving track 18 again. When an excessive number of defective articles are accumulated in bowl 12 after a long period of operation and successful orientation and feeding of many thousands of satisfactory articles, the defective articles may be manually removed from the bowl.

Various modifications of the invention may be made without departing from the teaching herein, there being only one embodiment illustrated in the interest of brevity and clarity. Moreover modification of the illustrated form may be made, such as the use of drain passages 96 in bowl 12 for automatic cleaning of the bowl, and the use of an aperture 98 in the discharge end of collector track 36 through which undersized articles and fragments will fall rather than enter chute 46. By relocating each of the gage pipe 70 to the aft end of each testing station the ultimate wafer discharge position will be with notch N facing in the opposite direction.

What is claimed is:

1. For use with a vibrating bowl adapted to impart linear motion to irregularly shaped, wafer-like articles disposed therein; means operatively connected with the bowl for orienting the articles and for constraining the path of travel thereof to a discharge station, said means including an inclined track on which the articles are adapted to progress and having a plurality of orientation testing openings therein spaced from each other and each constituting a part of a single orientation testing station, each opening having the same shape as said article means located after each station for rotating to a new position the articles that pass over each opening on said track for further testing, and means for collecting the articles that pass through each of said openings and for preserving the orientation thereof while moving the articles to the discharge station.

2. An article feeder comprising a vibratory base adapted to contain a group of disorganized, flat articles, means connected to said base and subjected to the vibratory motion thereof for selecting articles that are oriented in a predetermined position, said means comprising an article receiving track for accepting articles from the group of articles in said vibratory base, an article orientation testing track connected with and forming a continuation of said feed track and having a first and a second series of article orientation testing stations therein, each testing station of each series having an opening therein to accept the articles and means for excluding all articles that are oriented in positions other than a single predetermined position, means located after some of said stations for rotating each excluded, flat article in the plane of each article to a new oriented position for further testing at a subsequent station, means disposed between said first and said second groups of stations for inverting the articles so that said first group of stations receive the articles while moving on one surface thereof and the second group of stations receive the articles that pass beyond said first group of stations on the opposite surface of each article.

3. An article feeder comprising a vibratory base adapted to contain a group of disorganized, flat articles, means connected to said base and subjected to the vibratory motion thereof for selecting articles that are oriented in a predetermined position, said means comprising an article receiving track for accepting articles from the group of articles in said vibratory base, an article orientation testing track connected with and forming a continuation of said feed track and having a first and a second series of article orientation testing stations therein, each testing station of each series having an opening therein to accept the articles and means for excluding all articles that are oriented in positions other than a single predetermined position, means located after some of said stations for rotating each excluded, flat article in the plane of each article to a new oriented position for further testing at a subsequent station, means disposed between said first and said second groups of stations for inverting the articles so that said first group of stations receive the articles while moving on one surface thereof and the second group of stations receive the articles that pass beyond said first group of stations on the opposite surface of each article, means for collecting the articles accepted at each of said stations and preserving a definite orientation of the articles, and said collecting means having an end portion adapted to establish communication with a device to guide the articles to a place remote from the article feeder.

4. In a vibratory elevator having a vibratory bowl provided with an article receiving track, means connected to said bowl and communicating with said receiving track for orienting flat, substantially square articles that have an orienting notch in one edge thereof, said means comprising a testing track of helical form connected with said receiving track so that a stream of articles moving along said testing track enters and moves along said testing track, said testing track having a plurality of openings therein through which articles oriented in a single direction and moving along said testing track are adapted to fall, a gaging pin projecting within each opening, said gaging pins fitting in the orienting notch of each article that passes through said openings and constituting a support for other articles that attempt to pass through said openings in such orientation that the orientation notches thereof are spaced from said gaging pins.

5. In a vibratory elevator having a vibratory bowl provided with an article receiving track, means connected to said bowl and communicating with said receiving track for orienting flat, substantially square articles that have an orienting notch in one edge thereof, said means comprising a testing track of helical form connected with said receiving track so that a stream of articles moving along said testing track enters and moves along said testing track, said testing track having a plurality of openings therein through which articles oriented in a single direction and moving along said testing track are adapted to fall, a gaging pin projecting within each opening, said gaging pins fitting in the orienting notch of each article that passes through said openings and constituting a support for other articles that attempt to pass through said openings in such orientation that the orientation notches thereof are spaced from said gaging pins, a collector track disposed beneath the openings in said sampling track, and said article receiving track being connected with said vibratory bowl so that the articles on said collector track move continually toward one end thereof.

6. In a vibratory elevator having a vibratory bowl provided with an article receiving track, means connected to said bowl and communicating with said receiving track for orienting flat, substantially square articles that have an orienting notch in one edge thereof, said means comprising a testing track of helical form connected with said receiving track so that a stream of articles moving along said receiving track enters and moves along said testing track, said testing track having a plurality of openings therein through which articles oriented in a single direction and moving along said testing track are adapted to fall, a gaging pin projecting within each opening, said gaging pins fitting in the orienting notch of each article that passes through said openings and constituting a support for other articles that attempt to pass through said openings in such orientation that the orientation notches thereof are spaced from said gaging pins, means on the downstream side of some of said openings for rotating the articles that pass thereover to a new position, and means disposed between two of said openings for inverting the articles so that they may be tested for a predetermined orientation on two opposite surfaces thereof.

7. In the method of feeding flat articles which have an edge notch facing one direction, the steps of supplying a quantity of articles in disorganization to a supply zone, moving the articles individually in a path of travel from said supply zone, testing each article in said path for a predetermined oriented position of the edge notch and extracting all of said articles in the path that are in said predetermined position, rotating all of the other articles in said path to a new oriented position and further testing and extracting as aforesaid, inverting the articles that fail to be extracted in the last testing and extracting step, and again test and extract as aforesaid until the path of articles is reduced to substantially zero articles.

8. The method of claim 7 and the further step of guiding all of the extracted articles to a final acceptance location while preserving the orientation of each.

9. The method of claim 8 wherein said articles are rotated through an angle of ninety degrees in said step of rotating all of the articles in said path to a new oriented position.

10. The combination with a vibratory elevator bowl having a cylindrical wall of; an article receiving track connected with said wall up which articles are adapted to move, an orientation testing track connected to said cylindrical wall for vibrating therewith, a part of said testing track being located below said receiving track, a portion of said article receiving track directed downwardly toward said part of said testing track so that the articles on said receiving track are gravity fed into said testing track when they enter said portion, first means in said testing track for extracting articles which are in a definite orientation and means for rotating the other articles to another oriented position, second, third and fourth means in said testing track for further extracting articles while discriminating against articles which are oriented to positions other than said definite orientation, and a collector track connected to said wall and located beneath said extracting means to receive articles therefrom.

11. The combination with a vibratory elevator bowl having a cylindrical wall of; an article receiving track connected with said wall up which articles are adapted to move, an orientation testing track connected to said cylindrical wall for vibrating therewith, a part of said testing track being located below said receiving track, a portion of said article receiving track directed downwardly toward said part of said testing track so that the articles on said receiving track are gravity fed into said testing track when they enter said portion, first means in said testing track for extracting articles which are in a definite orientation and means for rotating the other articles to another oriented position, second, third and fourth means in said testing track for further extracting articles while discriminating against articles which are oriented to positions other than said definite orientation, each extracting means including an opening in said testing track of a size slightly larger than the articles handled thereby, and article discriminating means projecting in said openings.

12. The combination with a vibratory elevator bowl having a cylindrical wall of; an article receiving track connected with said wall up which articles are adapted to move, an orientation testing track connected to said cylindrical wall for vibrating therewith, a part of said testing track being located below said receiving track, a portion of said article receiving track directed downwardly toward said part of said testing track so that the articles on said receiving track are gravity fed into said testing track when they enter said portion, first means in said testing track for extracting articles which are in a definite orientation and means for rotating the other articles to another oriented position, second, third and fourth means in said testing track for further extracting articles while discriminating against articles which are oriented to positions other than said definite orientation, each extracting means including an opening in said sampling track of a size slightly larger than the articles handled thereby, and article discriminating means projecting in said openings, a collector track disposed below each opening upon which the articles that pass through said openings are adapted to fall, and a guard on said collector track for preventing articles from falling from said collector track.

13. The combination of claim 12 and; means on said testing track in advance of the fourth extracting means for inverting the articles.

14. An article feed device comprising an article orientation testing track having article discriminating means therein, a vibratory article receiving track for said testing track arranged to feed articles to the latter, said discriminating means including openings in said testing track through which articles are adapted to pass, means after each of said openings for rotating the articles to new oriented positions for further discriminatory selection of articles, and means to collect and discharge the articles which pass through said openings.

15. An article feed device comprising an article orientation testing track having article discriminating means therein, a vibratory article receiving track for said testing track arranged to feed articles to the latter, said discriminating means including openings in said testing track through which articles are adapted to pass, means after each of said openings for rotating the articles to new oriented positions for further discriminatory selection of articles, and means to collect and discharge the articles which pass through said openings including a collector track subject to vibratory motion to move the articles along toward the discharge end thereof.

16. An article feed device comprising an article orientation testing track having article discriminating means therein, a vibratory article receiving track for said testing track arranged to feed articles to the latter, said discriminating means including openings in said testing track through which articles are adapted to pass, means after each of said openings for rotating the articles to new oriented positions for further discriminatory selection of articles, and means to collect and discharge the articles which pass through said openings including a collector track subject to vibratory motion to move the articles along toward the discharge end thereof, and discharge end of said collector track having an aperture therein smaller in width than the width of the collector track for the passage and discharge of article pieces and objects smaller than the width of said collector track.

17. An article feed and orienting device comprising a bowl adapted to be vibrated and contain a supply of articles, a curved orientation testing track connected to said bowl and having article orientation testing means therein, said track being sloped toward the center of said bowl so that articles moving thereover are tilted toward the center of said bowl, a rail on the lower edge of said track against which the articles bear while moving along said track, said testing means including openings in the track together with gaging pins projecting in said openings to fit into an opening in each article that comes into contact therewith with its opening in a definite orientation, means operatively connected with said track after one of the openings in said track for rotating the articles to a new orientation that pass over said one of the openings in the track and consisting of an abrupt depression in said track providing two elevations of the track whereby the articles rotate by falling from one elevation to the other, and means to collect all of the articles that pass through said sampling means.

18. The device of claim 17 and; means disposed at said elevations to guide the rotation of the articles as they move from one elevation to the other.

19. In an article orientation device, a vibratory elevator to which a track is secured so that articles on said track continually move toward one end thereof, means in said track for selecting articles that are oriented in a definite position from said track, the other articles progressing along said track, an abrupt depression in said track after said selecting means, the track having a lower rail upon which the articles bear and the track lower rail having a terminal at said depression about which the articles rotate when they move sufficiently far beyond said terminal that the center of gravity of each article is so positioned to cause the articles to rotate.

20. In an article orientation device, a vibratory elevator to which a track is secured so that articles on said track continually move toward one end thereof, means in said track for selecting articles that are oriented in a definite position from said track, the other articles progressing along said track, an abrupt depression in said track after said selecting means, the track having a lower rail upon which the articles bear and the track lower rail having a terminal at said depression about which the articles rotate when they move sufficiently far beyond said terminal that the center of gravity of each article is so positioned to cause the articles to rotate, and means disposed above said depression and contactable by an upper portion of each article entering said depression for guiding and accelerating the rotation of the articles.

21. The combination of claim 20 and; means for retaining said article guiding and accelerating means in a selected, adjusted position.

22. The combination of claim 21 and; means connected with said vibratory elevator and located beneath said article selecting means for collecting the articles that are selected by said selecting means.

23. The combination of claim 22 and; means associated with said article collecting means for preventing the articles collected thereon from escaping.

24. In an article orientation device, a vibratory elevator to which a track is secured so that articles on said track continually move toward one end thereof, means in said track for selecting articles that are oriented in a definite position from said track, the other articles progressing along said track, means operatively connected with said track for rotating the articles to a new position, additional selecting means in said track after said article rotating means, and means in advance of said additional selecting means for inverting the articles for further selecting of articles in a definite orientation.

25. The combination of claim 24 and; said track including a lower rail and an upper rail on which one edge of each article bears while progressing along said track, an article inverting station in said track at which said lower rail projects beyond a terminal of said upper rail so that articles moving on said lower rail gravitationally fall with the upper edge of the articles swinging arcuately while the lower edge remains on said lower rail.

26. In the method of article orientation and feeding, the steps of extracting a plurality of articles from a supply thereof and moving them in a stream to an elevation above the supply, testing the orientation of the articles making up the stream as they pass a first testing station, extracting the articles from at said first station that are in one oriented position, rotating all of the other articles to a new position and further testing the orientation thereof, again selecting all of the articles that are in said one oriented position, inverting the articles while continuing to move them in said path and further testing the orientation thereof and selecting those articles that are in said one oriented position, collecting all of the articles that are selected and moving them in a new path of travel, and discharging all of the articles in said new path of travel.

27. The method of claim 26 and, the step of sifting from the new path of travel article fragments and other foreign matter.

28. For use with a vibratory elevator having a vibrating base, means to orient and feed properly oriented flat, generally square articles having equally spaced edge notches together with an orienting notch located between two of the equally spaced edge notches, an orientation testing track for the articles and means for feeding the articles to said track from the vibrating base, said testing track having an opening therein through which properly oriented articles may pass, a pin projecting into said opening from one edge thereof and spaced from the other edges of said opening, said pin bearing against the lower surface of the articles passing over said opening and fitting into the orienting notch of the articles that come over said opening with the orienting notch positioned to receive said pin.

29. For use with a vibratory elevator having a vibrating base, means to orient and feed properly oriented flat, generally square articles having equally spaced edge notches together with an orienting notch located between two of the equally spaced edge notches, an orientation testing track for the articles and means for feeding the articles to said track from the vibrating base, said testing track having an opening therein through which properly oriented articles may pass, a pin projecting into said opening from one edge thereof and spaced from the other edges of said opening, said pin bearing against the lower surface of the articles passing over said opening and fitting into the orienting notch of the articles that come over said opening with the orienting notch positioned to receive said pin, said track having a lower rail upon which the lower edge of the articles move, said lower rail terminating in advance of said opening and temporarily engaging one of the edge notches of an article passing thereover to form a fulcrum for the article as it falls from the terminal of said lower rail thereby rotating the article to a new oriented position.

30. In the method of orienting each article of a disorganized group of articles for feeding in a definite orientation; the steps of moving the articles individually in a first described path to a first testing station, testing the position of each article at the first testing station, passing all the moving articles that are in a predetermined orientation at the first station to a second path and passing the other articles that enter said first station to a third path, rotating all the articles passed to said third path to a new orientation, passing the articles moving in the third path to a second testing station, testing the position of each article at the second testing station, passing all the moving articles that are in a predetermined orientation at the second station to a fourth path and passing the other articles that enter said second station to a fifth path, and collecting all the articles from said second and fourth paths.

31. In the method of orienting each article of a disorganized group of articles for feeding in a definite orientation; the steps of moving the articles individually in a first described path to a first testing station, testing the position of each article at the first testing station, passing all the moving articles that are in a predetermined orientation at the first station to a second path and passing the other articles that enter said first station to a third path, inverting all the articles passed to said third path, passing the articles moving in the third path to a second testing station, testing the position of each article at the second testing station, passing all the moving articles that are in a predetermined orientation at the second station to a fourth path and passing the other articles that enter said second station to a fifth path, and collecting all the articles from said second and fourth paths.

References Cited in the file of this patent

UNITED STATES PATENTS

| | | |
|---|---|---|
| 1,161,577 | Alberti et al. | Nov. 23, 1915 |
| 1,195,054 | McLeod | Aug. 15, 1916 |
| 1,242,086 | Von Henriquez | Oct. 2, 1917 |
| 1,406,963 | Angus | Feb. 21, 1922 |
| 1,421,056 | Alling et al. | June 27, 1922 |
| 1,456,216 | Brightman | May 22, 1923 |
| 1,734,868 | Milne | Nov. 5, 1929 |
| 2,065,319 | Lewis | Dec. 22, 1936 |
| 2,336,606 | Everett | Dec. 14, 1943 |
| 2,344,461 | Hermani | Mar. 14, 1944 |
| 2,609,914 | Balsiger et al. | Sept. 9, 1952 |
| 2,694,482 | Masengill | Nov. 16, 1954 |

FOREIGN PATENTS

| | | |
|---|---|---|
| 52,275 | Sweden | Apr. 19, 1917 |

UNITED STATES PATENT OFFICE
CERTIFICATE OF CORRECTION

Patent No. 2,807,350 September 24, 1957

Charles C. Rayburn et al.

It is hereby certified that error appears in the printed specification of the above numbered patent requiring correction and that the said Letters Patent should read as corrected below.

Column 7, line 28, for "pipe" read -- pins --; column 8, line 30, for "testing" read -- receiving --; line 47, for "testing track enters" read -- receiving track enters --; line 57, for "sampling" read -- testing --; column 9, line 19, for "test and extract" read -- testing and extracting --; column 10, lines 8 and 9, for "sampling" read -- testing --; column 11, line 2, for "sampling" read -- testing --; line 67, after "from" strike out "at".

Signed and sealed this 31st day of May 1960.

(SEAL)
Attest:

KARL H. AXLINE
Attesting Officer

ROBERT C. WATSON
Commissioner of Patents